United States Patent
Rosenblatt et al.

(10) Patent No.: US 11,227,333 B2
(45) Date of Patent: Jan. 18, 2022

(54) USING AUTOMATED DATA VALIDATION IN LOAN ORIGINATION TO EVALUATE CREDIT WORTHINESS AND DATA RELIABILITY

(71) Applicant: Fannie Mae, Washington, DC (US)

(72) Inventors: Eric Rosenblatt, Derwood, MD (US); Stacey Shifman, Rockville, MD (US); Lois Wesly, Washington, DC (US); Alex Medinets, Washington, DC (US); Khristina Waters, Keedysville, MD (US)

(73) Assignee: Fannie Mae, Washington, DC (US)

( * ) Notice: Subject to any disclaimer, the term of this patent is extended or adjusted under 35 U.S.C. 154(b) by 73 days.

(21) Appl. No.: 16/807,793

(22) Filed: Mar. 3, 2020

(65) Prior Publication Data
US 2020/0202431 A1    Jun. 25, 2020

Related U.S. Application Data

(63) Continuation of application No. 15/157,696, filed on May 18, 2016, now Pat. No. 10,621,664.

(51) Int. Cl.
*G06Q 40/02* (2012.01)
*G06Q 20/38* (2012.01)

(52) U.S. Cl.
CPC ....... *G06Q 40/025* (2013.01); *G06Q 20/3829* (2013.01)

(58) Field of Classification Search
CPC .......... G06Q 40/025; G06Q 20/3829
USPC ................................ 705/3–44, 71
See application file for complete search history.

(56) References Cited

U.S. PATENT DOCUMENTS

| | | | |
|---|---|---|---|
| 5,592,375 A | 1/1997 | Salmon et al. | |
| 6,487,540 B1 | 11/2002 | Smith et al. | |
| 6,629,081 B1 * | 9/2003 | Cornelius | G06Q 20/04 705/30 |
| 6,904,416 B2 * | 6/2005 | Nassiri | G06Q 20/401 705/51 |

(Continued)

OTHER PUBLICATIONS

"What do borrowers really want", Mortgage Banking 77.1:82, Mortgage Bankers Association of America, ISSN: 0730-0212, Oct. 2016.*

(Continued)

*Primary Examiner* — Frantzy Poinvil
(74) *Attorney, Agent, or Firm* — Michael Best and Friedrich LLP

(57) ABSTRACT

A system, comprises a device including a memory with an application configured to validate data in an acquisition installed thereon, wherein the system is improved by the application being configured to electronically receive a query for a financial transaction between a first party and a second party, electronically transmit an encryption key from the second party to a third party, electronically transmit the encryption key from the second party to a data source and accessing a first set of a data associated with the financial transaction, electronically receive the first set of data associated with the financial transaction and validate the first set of data associated with the financial transaction by applying validation heuristics and output a finding report and provide the second party validation heuristic output in the finding report.

16 Claims, 7 Drawing Sheets

(56) References Cited

U.S. PATENT DOCUMENTS

| | | | |
|---|---|---|---|
| 7,213,064 B2 | 5/2007 | Smith et al. | |
| 7,299,408 B1 * | 11/2007 | Daconta | G06Q 40/025 715/234 |
| 7,363,308 B2 | 4/2008 | Dillon et al. | |
| 7,657,832 B1 | 2/2010 | Lin | |
| 8,260,638 B2 | 9/2012 | McNamee et al. | |
| 8,260,699 B2 | 9/2012 | Smith et al. | |
| 8,442,906 B1 * | 5/2013 | Thomas | G06Q 30/0623 705/38 |
| 8,489,474 B2 * | 7/2013 | Crook | G06Q 10/04 705/35 |
| 8,517,534 B2 | 8/2013 | Sone et al. | |
| 8,560,366 B2 * | 10/2013 | Mikurak | G06Q 10/06375 705/7.12 |
| 8,655,045 B2 * | 2/2014 | Jones | G06Q 20/10 382/135 |
| 8,732,023 B2 | 5/2014 | Mikurak | |
| 8,752,001 B2 | 6/2014 | Sureka et al. | |
| 8,909,551 B2 * | 12/2014 | Pawlusiak | G06Q 40/025 705/38 |
| 8,954,476 B2 * | 2/2015 | Rosenberg | G06Q 10/00 707/803 |
| 2005/0080721 A1 * | 4/2005 | Kearney | G06Q 40/025 705/38 |
| 2008/0040151 A1 | 2/2008 | Moore | |
| 2008/0272186 A1 | 11/2008 | Silverbrook et al. | |
| 2009/0043690 A1 * | 2/2009 | MacLellan | G06Q 40/02 705/38 |
| 2010/0036684 A1 | 2/2010 | McNamee et al. | |
| 2010/0185534 A1 * | 7/2010 | Satyavolu | G06Q 10/063 705/30 |
| 2011/0035268 A1 | 2/2011 | Rossi | |
| 2011/0246346 A1 * | 10/2011 | Satyavolu | H04M 15/58 705/35 |
| 2012/0030187 A1 | 2/2012 | Morano et al. | |
| 2013/0226757 A1 | 8/2013 | Bouma et al. | |
| 2013/0325681 A1 | 12/2013 | Somashekar et al. | |
| 2014/0279387 A1 * | 9/2014 | Shifman | G06Q 40/025 705/38 |
| 2014/0279389 A1 | 9/2014 | Monaco et al. | |
| 2015/0089345 A1 * | 3/2015 | Marimuthu | G06F 40/174 715/221 |
| 2015/0161726 A1 * | 6/2015 | Pawlusiak | G06Q 40/02 705/38 |
| 2017/0337628 A1 * | 11/2017 | Arnall | G06Q 50/16 |
| 2017/0352014 A1 | 12/2017 | Smith et al. | |
| 2018/0218448 A1 | 8/2018 | Thomas et al. | |
| 2019/0012318 A1 * | 1/2019 | Templain | G06Q 30/06 |
| 2019/0066203 A1 | 2/2019 | Smith et al. | |

OTHER PUBLICATIONS

Marianna, "Threshold accepting for credit risk assessment and validation", Journal of Banking Regulation, London vol. 16, Iss. 2, Apr. 2015 : 130-145. (Year: 2015).

Sousa, "Credit analysis using data mining : Application in the case of a credit union", JISTEM—Journal of Information Systems and Technology Management, vol. 11., No. 2, May/Aug. 2014 pp. 379-396., ISSN online : 1807-1775. (Year: 2014).

* cited by examiner

| Casefile ID: | 1162786093 |
| Finding ID: | 57705389 * |
| | Find |
| First Submitted: | 20151123 23:29 |
| Engine Version: | UW_9.30 |
| Submission #: | 1 |
| Inst ID: | 113776 |
| Create Date: | 20151123 08:00 |
| | Logout |

DU Reported Income — 400a

| Borrower Name | SSN | Self Employed | Base | Overtime | Bonus | Commission | Social Security | Pension/Retirement |
|---|---|---|---|---|---|---|---|---|
| Homer Loanseeker | | N | 3073.20 | | | | 1704.97 | 297917 |

Income Validation Summary

Full Validation Detail     Status : Success

| Borrower Name | Applicant ID | Base | Overtime | Bonus | Commission | Social Security | Pension/Retirement | TWN | IRS |
|---|---|---|---|---|---|---|---|---|---|
| Homer Loanse... | 577345629 | 3073.20 | | | | | | Q | Get Form ▼ |

Income Validation Messages

| | Borrower Name | Category | Name |
|---|---|---|---|
| ⊞ | Homer Loanseeker | Suppressed DU Message | TIMESAVER-INCOME-REQMNTS |
| ⊞ | Homer Loanseeker | Suppressed DU Message | SOCIAL-SECURITY-INCOME-VERIFICATION |
| ⊞ | Homer Loanseeker | Suppressed DU Message | RETIREMENT-INCOME-VERIFICATION |
| ⊞ | Homer Loanseeker | TAU Message | INTUIT-REFERENCE |
| ⊞ | Homer Loanseeker | TAU Message | TAU-BASE-NO-VERIFICATION |
| ⊞ | Homer Loanseeker | TAU Message | TAU-SOCIAL-SECURITY-NO-VERIFICATION |
| ⊞ | Homer Loanseeker | TAU Message | TAU-RETIREMENT-VERIFICATION |

$ Income    ◇ Assets

USING AUTOMATED DATA VALIDATION IN LOAN ORIGINATION TO EVALUATE CREDIT WORTHINESS AND DATA RELIABILITY

CROSS REFERENCES TO RELATED APPLICATIONS

This is a continuation of U.S. patent application Ser. No. 15/157,696, filed May 18, 2016, the entire contents of all of which are hereby incorporated by reference.

BACKGROUND OF THE INVENTION

1. Field of the Invention

This application relates to automated data validation for loan origination data more particularly to evaluate credit worthiness and data reliability.

2. Description of Related Art

Misrepresentations of income, assets, identity or other key factors on a loan application are difficult to predict because, by definition, borrowers may purposefully attempt to hide fraud in order to secure the loan and evade criminal punishment. Because these misrepresentations present a significant risk in lending and repurchasing, it may be prudent to search for and identify loan applications with characteristics indicative of misrepresentation so that more educated decisions regarding repurchase decisions and transaction validations can be made.

A lender may be concerned with whether the lender's data are sufficient to determine the credit worthiness of the borrower, whether any supplemental findings support or dispute the lender's assertions about the credit worthiness of the borrower, whether there are any misrepresentations or inconsistencies in the accounts that would affect the lender's view of the borrower's credit worthiness and whether additional data obtained by third party verification supports or contradicts borrower assertions about income and assets.

Therefore, the present invention relates generally to validating documents and more particularly to automated electronic validation to validate data in loan origination data to evaluate credit worthiness and data reliability.

Information and data are being increasingly processed electronically in lieu of traditional paper processes. Electronic documents offer substantial benefits, such as cost reduction and the accommodation of rapid manipulation and organization of information. However, issues arise around electronic documentation such as: authenticity (that a document is what it purports to be and has been actually signed by the appropriate entities), integrity (that a document is complete and unaltered), and validity (that a document complies with business and legal rules). Validations of electronic documents satisfy these concerns and help to support the adoption of electronic documents in various environments.

The collection, generation, movement, and authentication of paper documents among numerous unrelated parties is been critical to the mortgage process and repurchase process.

Computers and telecommunications have been used to improve the mortgage process for both consumers and service providers and various systems have been developed for streamlining the application, evaluation, underwriting, and origination processes.

Similarly, once a mortgage has been originated, electronic data networks have improved information sharing among parties in the secondary mortgage market. These data networks facilitate transactions and decrease processing times for mortgage servicers, mortgage owners, and creators of mortgage-backed securities.

Once a mortgage has been originated, electronic data networking has improved information sharing among parties in the secondary mortgage markets.

These data networks facilitate transactions and decrease processing times for mortgage servicers, mortgage owners, and creators of mortgage-backed securities.

Historically, successors to a contract would provide a credit umbrella to a mortgage between a borrower and a lender on the condition that the lender first collects and validates a first set of data such as: asserted incomes, assets and liabilities of the borrower.

The lender would validate this provided data by contacting various banks, tax providers, the Internal Revenue Service, credit repositories or any other entity capable of providing electronic validation of the borrower's claims.

However, a problem with electronic document validation is securely sharing data among parties in the secondary mortgage markets.

The secondary mortgage market includes several different parties, namely: a first party (e.g. an applicant, borrower, insured, etc.), a second party (e.g. underwriter, lender, broker, agent, correspondent, initial contractor, etc.) and a third party (e.g. insurance, reinsurance, securitization, rating agency, successor, etc.).

In the automated process of supporting due diligence of a third party, which seeks to acquire a contract for a loan associated with a financial transaction from a second party, the data relied upon by the second party must be validated via electronic transmission from a trusted repository (e.g. government entity, bank, employer, credit agency, etc.).

SUMMARY OF THE INVENTION

Thus, what is needed is an automated, computerized and electronic Data Validation System (hereafter "DVS"), which verifies the correspondence of processed data to that contained on documents actually used in transactions and that provides greater assurances of data integrity than is provided with conventional electronic document validation by providing a mechanism whereby, in the secondary mortgage market, the third party of the mortgage receives from the second party, an encryption key allowing the third party to acquire first set of data and perform validation on said first set of data.

The encryption key would allow the third party to access and validate data associated with the contract for loan by providing access to original trusted repositories to perform validation.

By passing the encryption key from the second party to the third party, the system allows the third party to validate the data associated with the contract for a loan.

The present disclosure provides improved electronic document validation using an encryption key to validate data provided by a first party to a second party and verified by a third party.

Validation of the data are variously helpful in originating, closing and delivering loans to an investor in what is referred to as the secondary mortgage market.

In one aspect of the invention, electronic document validation verifies data provided by a first party to a second party. The second party provides an encryption key to a third party allowing the third party to receive an audit copy of data from the original trusted repository and to validate the data through a set of validation rules which are retrieved and applied to the data.

Preferably, the data validation ensures that the data are tamper-proof (e.g. ensuring that a document is not altered), non-repudiation (e.g. evidencing that a document was signed by a particular entity at a particular date and time), field validation (e.g. checking that information in a document complies with content category rules), logging (e.g. recording actions performed on the document, with actor identification), access control (e.g. facilitating prevention of unauthorized users from accessing the document) and self-sufficiency (e.g. avoiding reliance on external software).

The present disclosure solves the above noted problems by providing methods, computer applications, and computing systems for automated data validation.

According to one exemplary embodiment of the present disclosure, a method for validating data using an encryption key to support end user decisions, the method comprising electronically receiving a query for a financial transaction between a first party and a second party; electronically transmitting an encryption key from the second party to a third party, electronically transmitting the encryption key from the second party to a data source and accessing a first set of a data associated with the financial transaction, electronically receiving the first set of data associated with the financial transaction and validating the first set of data associated with the financial transaction by applying validation heuristics and outputting a finding report and automatically releasing the second party from liability based on the finding report.

According to another exemplary embodiment of the present disclosure, a system comprising a device including a memory with an application which is configured to validate data using an encryption key to support end user decisions installed thereon, where the application is configured to receive a query for a financial transaction between a first party and a second party; electronically transmit an encryption key from the second party to a third party, electronically transmit the encryption key from the second party to a data source and accessing a first set of a data associated with the financial transaction, electronically receive the first set of data associated with the financial transaction and validate the first set of data associated with the financial transaction by apply validation heuristics and output a finding report and automatically release the second party from liability based on the finding report.

According to another exemplary embodiment of the present disclosure, a non-transitory computer readable medium that stores program code that is configured to, when executed by a computing system, cause the computing system to perform operations comprising electronically receiving a query for a financial transaction between a first party and a second party; electronically transmitting an encryption key from the second party to a third party, electronically transmitting the encryption key from the second party to a data source and accessing a first set of a data associated with the financial transaction, electronically receiving the first set of data associated with the financial transaction and validating the first set of data associated with the financial transaction by applying validation heuristics and outputting a finding report.

The present invention can be embodied in various forms, including business processes, computer implemented methods, computer program products, computer systems and networking, user interfaces, application programming interfaces and the like.

BRIEF DESCRIPTION OF THE DRAWINGS

These and other more detailed and specific features of the present invention are more fully disclosed in the following specification, reference being had to the accompanying drawings, in which:

FIGS. 4A-B illustrate display diagrams for an income validation view and a corresponding income verification report.

FIGS. 5A-B illustrate display diagrams for an asset validation view and an asset verification report.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

The present disclosure relates to a data validation system and method for validating data that may provide, through generated user interfaces, a view of a first set of data. The system is improved by using an encryption key to securely transfer the data between parties.

A first party being an applicant, borrower, insured, etc. A second party being an underwriter, lender, broker, agent, correspondent, initial contractor, etc. Finally, a third party being successor, insurance agent, securitization, rating agency, etc.

The decision support system may further be configured to request a first set of data from a original trusted repository (hereinafter referred to as "Data Source") using the encryption key from the second party, receive the first set of data from the Data Source and execute a data validation model (hereinafter referred to as a "Model") in support of validating the first set of data.

Once the Model has validated the first set of data by executing business logic and applying business rules (i.e. model heuristics) on the first set of data, the decision support system may output the findings through user interfaces to support end user decisions regarding the financial transaction via a finding report.

The Model, which may also be referred to as a data validation application, may comprise a suite of models and methodologies referred to as model heuristics that may generate probability estimations and/or flags for validating and accessing credit worthiness (e.g. by detecting discrepancies, incentives and trends within and across the first set of data).

Issues may include incorrect data within the documentation due to a mistake, misrepresentation and/or fraud. For example, the Model would validate a first set of data which can include documents such as: underwriting submissions, approvals, loan documents, credit reports and the like.

The Model may validate the first set of data by executing business logic and applying business rules (i.e. model heuristics) on the underwriting output (UWO), scorecard output (SCO) and the audit copy of the first set of data from the original trusted repository.

Therefore, the Model may analyze the first set of data by applying business rules to validate assertions made by the first party.

Figure 1:
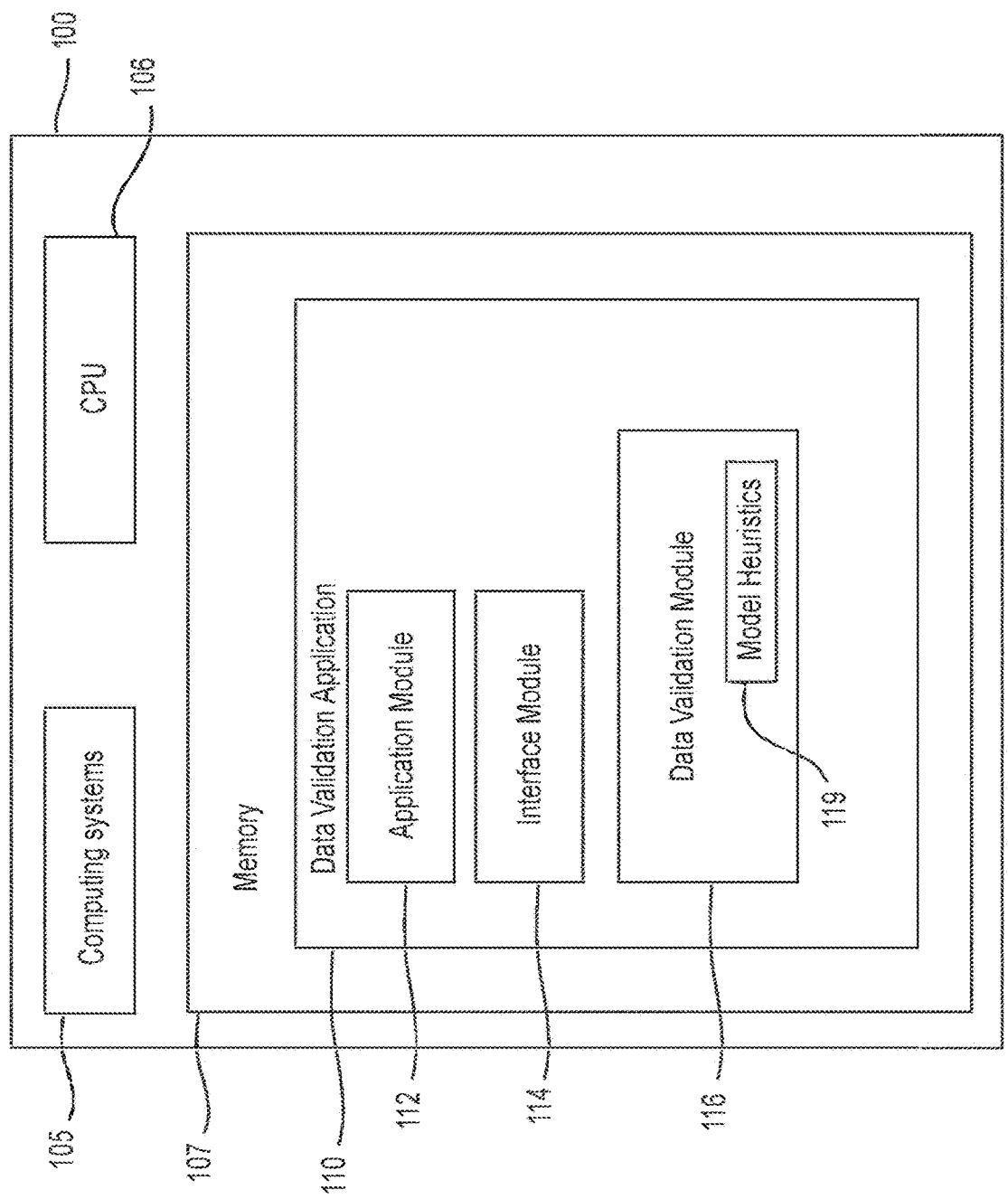
FIG. 1 illustrates an exemplary decision support system, which includes a data validation application.

FIG. 1 illustrates an exemplary decision support system 100 that includes a computing system 105 having a central processing unit (CPU) 106 and a memory 107 on which a data validation application 110 is stored comprising an application module 112 and an interface module 114 (which generates user interfaces 115).

The exemplary decision support system 100 may utilize computing system 105 and the automated data validation application 110 to enable the acquiring and receiving of the first set of data and executing of model heuristics 119 (i.e. business logic and business rules) on the first set of data.

The exemplary computing system 105 may be any computing system and/or device that include a processor and a memory.

In general, computing systems and/or devices may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing systems and/or devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc.

The exemplary decision support system 100 and the exemplary computing system 105 may take many different forms and include multiple and/or alternate components and facilities, e.g., as illustrated in the Figures further described below.

While exemplary systems are shown in Figures, the exemplary components illustrated in Figures are not intended to be limiting. Indeed, additional or alternative components and/or implementations may be used.

In general, a processor or a microprocessor (e.g., CPU 106) receives instructions from a memory (e.g., memory 107) and executes these instructions, thereby performing one or more processes, including one or more of the processes described herein. Such instructions and other data may be stored and transmitted using a variety of computer-readable media. The CPU 106 may also include processes comprised from any hardware, software, or combination of hardware or software that carries out instructions of a computer programs by performing logical and arithmetical calculations, such as adding or subtracting two or more numbers, comparing numbers, or jumping to a different part of the instructions.

For example, the CPU 106 may be any one of, but not limited to single, dual, triple, or quad core processors (on one single chip), graphics processing units, visual processing units, and virtual processors.

The memory 107 may be, in general, any computer-readable medium (also referred to as a processor-readable medium) that may include any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer.

Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The data validation application 110 may be software stored in the memory 107 of the computing system 105 that may be executed by the CPU 106 of the computing system 105 to perform one or more of the processes described herein, such as applying the model heuristics 119 stored on the data validation module 116 to first set of data associated with an application for a loan.

In general, the data validation application 110 may be configured to acquire and/or receive the first set of data as is available in a database 120. The acquisition may include loans and respective data delivered to the exemplary decision support system 100 for storage on the database 120 and processing by the data validation application 110. The data validation application 110 may further synchronize the acquisition with the model heuristics 119 that seek data reliability for credit eligibility, income and the like.

A credit report may be an account or statement describing an individual's financial history. In general, an organization, e.g., a credit bureau, compiles financial information for each individual. When that individual applies for a new loan or credit account, lenders use their financial information to determine the individual's credit worthiness.

Credit worthiness is a determination of an individual's ability to make, willingness to pay for, and track record for debt payments, as indicated by timely payments to past or current financial obligations.

The application module 112 may include program code configured to facilitate communication between the modules of the data validation application 110 and hardware/software components external to the data validation application 110. For instance, the application module 112 may be configured to communicate directly with other applications, modules, models, devices, systems, and other sources through both physical and virtual interfaces.

That is, the application module 112 may include program code and specifications for routines, data structures, object classes, and variables that receive, package, present, and transfer data through a connection or over a network, as further described below. For example, the application module 112 may be configured to receive input via the user interfaces 115 generated by the interface module 112 and access a database 120.

The interface module 114 may include program code for generating and managing user interfaces 115.

For instance, the interface module 114 may be configured to generate, present, and provide one or more user interfaces 115 (e.g., in a menu, icon, tabular, map, or grid format) in connection with other modules for presenting information (e.g., data, notifications, instructions, etc.) and receiving inputs (e.g., configuration adjustments, such as inputs altering, updating, or changing the model heuristics 119).

For example, the interface module 114 may be configured to generate the user interfaces 115 for user interaction with the data validation application 110, as described below in reference to the below FIG. 2.

The user interfaces 115 described herein may be provided as software that when executed by the CPU 106 present and receive the information described herein.

The user interfaces 115 may also be provided as hardware or firmware, or combinations of software, hardware and/or firmware.

The model heuristics 119 of the data validation application 110 may in view of these results provide flags, tokens, markers, messages, pop-ups, or the like, which identify financial transaction as having poor data reliability and notify an end user of the results via a finding report reflecting these findings.

The database 120 may include any type of data or file system (e.g., data sources 121) that operates to support the data validation 110.

For instance, data sources 121 may include documentation (e.g., underwriting submissions, underwriting approvals, loan documents, and the like) relating to an application for a financial transaction, and/or any other data relating to or including borrower information, financial address information, reported address information, loan information, status information, etc. The data, heuristics, and variables of the exemplary decision support system 100 that support and enable the above described utility may be stored locally, externally, separate, or any combination thereof, as further described below.

In general, databases, data repositories or other data stores, such as database 120, described herein may include various kinds of mechanisms for storing, providing, accessing, and retrieving various kinds of data, including a hierarchical database, a set of files in a file system, an application database in a proprietary format, a relational database management system (RDBMS), etc.

Each such data store may generally be included within a computing system (e.g., computing system 105) employing a computer operating system such as one of those mentioned above, and are accessed via a network or connection in any one or more of a variety of manners.

A file system (e.g., data sources 121) may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In addition, as indicated in FIG. 1, database 120 includes data sources 121 and may be provided as software stored on the memory 107 of computing system 105.

Database 120 may also be provided as hardware or firmware, or combinations of software, hardware and/or firmware.

Figure 2:
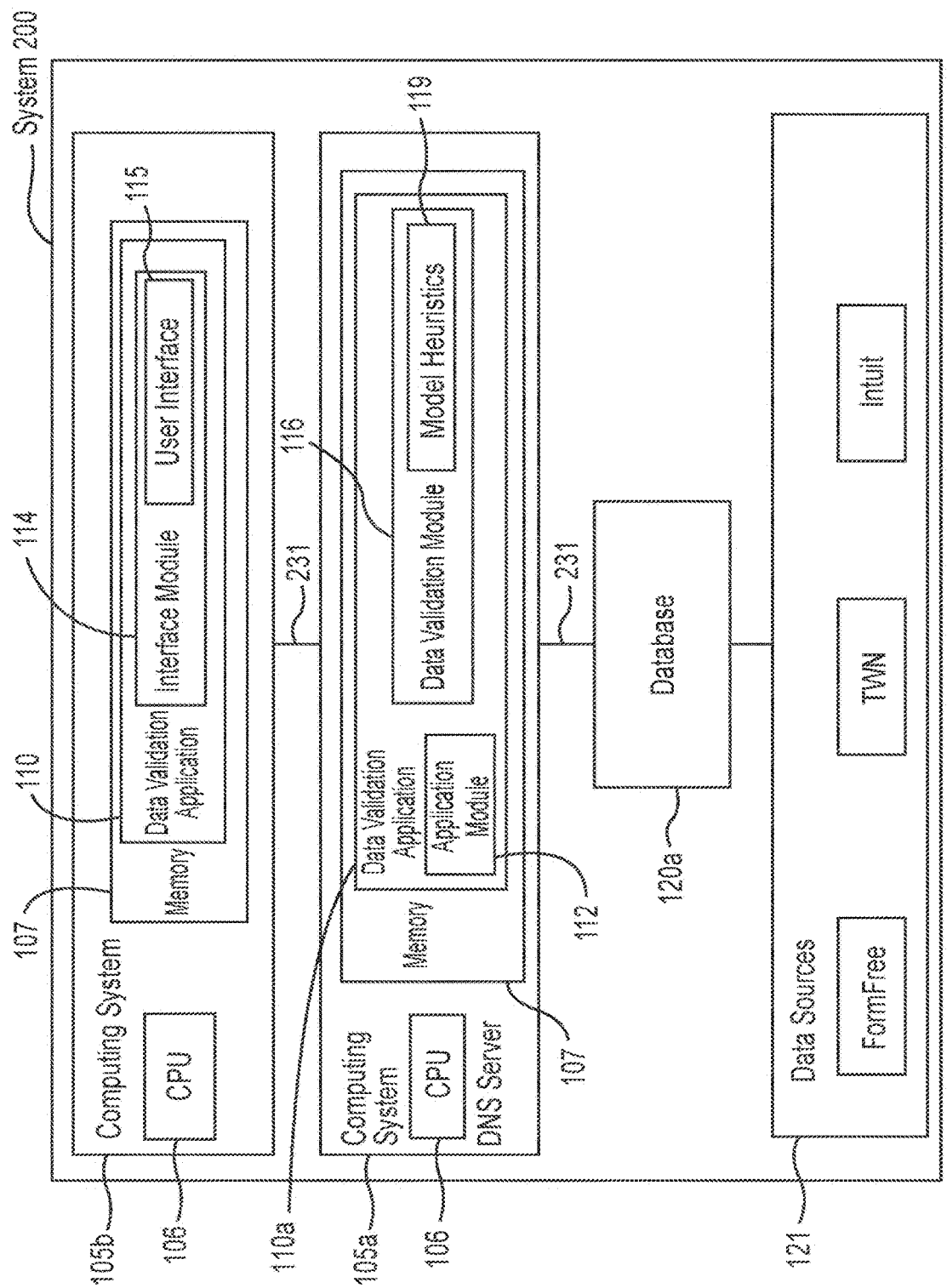
FIG. 2 illustrates an exemplary decision support system in which a DVS server operates.

For example, as indicated in FIG. 2, database 120 may be a computing system as described above, including a CPU 106 and memory 107 that is separate from a computing systems 105a-b.

Further, in some examples, computing system 105 elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In addition, the computing system 105 may take many different forms and include multiple and/or alternate components and facilities, (e.g., as in the Figures further described below).

While an exemplary computing system 105 is shown in FIG. 1, the exemplary components illustrated in the Figures are not intended to be limiting. Indeed, additional or alternative components and/or implementations may be used.

In addition, although FIG. 1 illustrates modular examples of the data validation application 110, where the modules may be software that when executed by the CPU 106 provides the operations described herein, the data validation application 110 and its modules may also be provided as hardware or firmware, or combinations of software, hardware and/or firmware.

Additionally, although one example of the modularization of the data validation application 110 is illustrated and described, it should be understood that the operations thereof may be provided by fewer, greater, differently named, or differently located modules.

FIG. 2 illustrates an exemplary decision support system 200 including multiple computing systems. For instance, the exemplary decision support system 200 may include a computing system 105, CPU 106 and memory 107 with a data validation application 110 installed thereon, and a database with corresponding data sources. Note that the same or equivalent elements as those of the FIG. 1 described above are denoted with similar reference numerals.

Physical connections 231 may be wired or wireless connections between two endpoints (devices or systems) that carry electrical signals that facilitate virtual connections (e.g., transmission media including coaxial cables, copper wire, fiber optics, and the like).

For instance, the physical connection 231 may be a wired connection between computer systems 105a and database 120a, and the other physical connections 231 may be wired or wireless connections between computer systems 105a-b and database 120b. Further, the physical connections 231 may be comprised of computers and other hardware that respectively connects endpoints as described.

FIG. 2 further illustrates an exemplary decision support system 200 including multiple computing systems, as described above, where a DVS server (computing system 105a) operates in combination with the data validation application 110a to perform the operations described herein.

The exemplary decision support system 200 may include computing systems such as the DVS server 105a, computing systems 105b and a DVS Database 120a, which connect via respective direct physical connections 231.

The DVS server 105a may provide host services to other computing systems 105b while accessing databases 120a.

The end user may also review the efficacy of the model heuristics 119 in defect identification and hypothesize improvements to the model heuristics 119.

Figure 3:
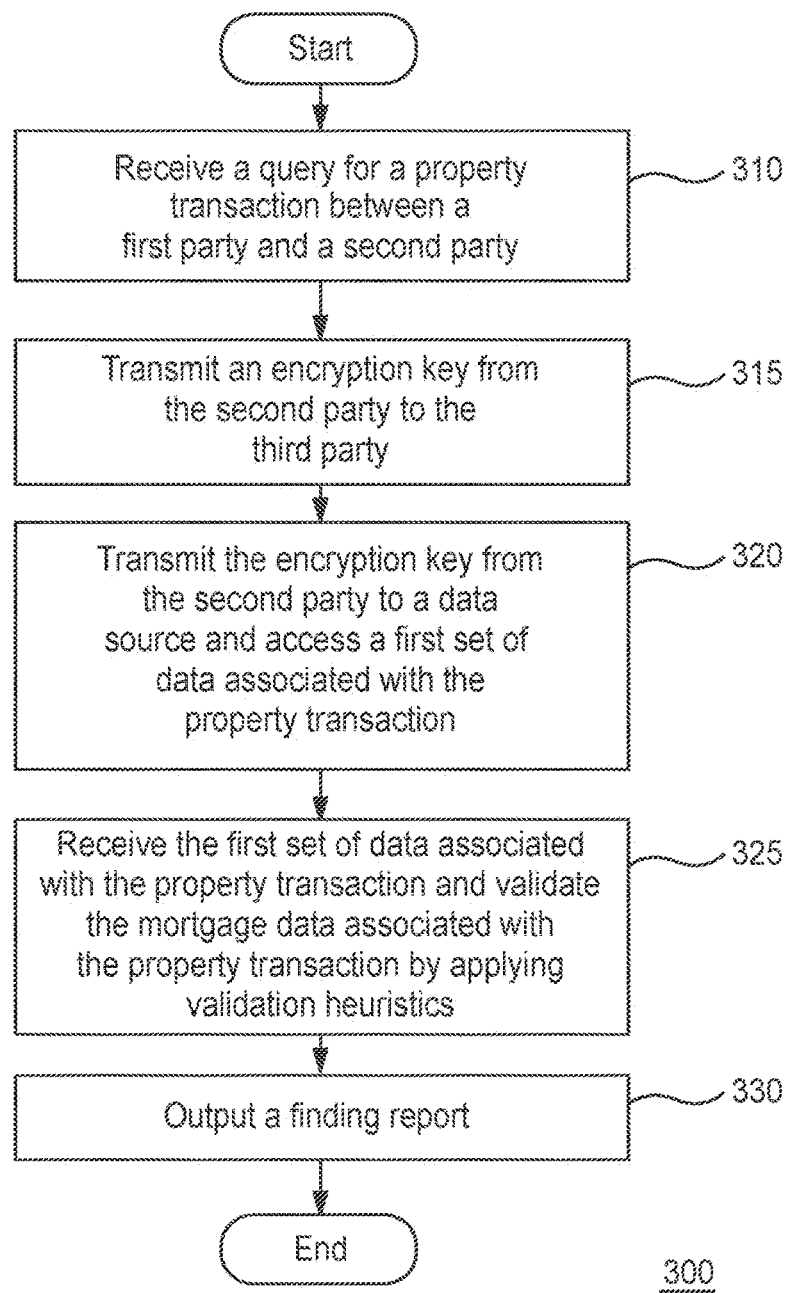
FIG. 3 illustrates an exemplary process flow executed by an automated data validation application.

FIG. 3 illustrates a process flow 300 utilized by the DVS server 105a (e.g., a data validation application 110a) to validate first set of data for a contract of a financial transaction in support of end user decisions (i.e. a third party).

FIG. 3 illustrates exemplary interfaces that the end user may encounter when interacting with the DVS server 105a through the computing systems 105b.

The process flow 300 may start with the DVS server 105a receiving 310, a query regarding a financial transaction between a first party and a second party.

For example, the query may identify an application for a loan associated with a financial transaction, which indicates that the end user wishes to determine the validity of the first set of data in the application to evaluate credit worthiness and data reliability.

In response to the query, the second party transmits an encryption key from the second party to the third party 315 in order to access the data source 315.

The DVS server 105a continues by transmitting the encryption key (same one as received from the second party) to the data source (e.g., access at least one database (e.g., database 120a) to retrieve documentation and secondary information corresponding to the identified contract using an encryption key provided to the third party by the second party 320.

The DVS Server uses an encryption key to access databases 120a to retrieve a delivered loan particular to the entered criteria related to the delivered loan stored within the data sources 121.

The exemplary decision support system 200 may be configured to ensure that necessary data were available for a particular contract of a financial transaction before producing a finding report.

The validation may extend to banks, tax providers, the IRS, credit repositories or any other entity capable of providing electronic validation of the assertions of the first party.

The data source 121 includes data such as employment history and income data including base employment income, overtime, bonuses and commissions; IRS tax return data including commissions, social security, disability and pension/annuity income; asset data including checking, saving, CDs, money market, retirement account, stocks and mutual funds.

For example, Fannie Mae provides a set of standards through its Desktop Underwriter™ software for certifying the creditworthiness of a given mortgage and its viability in the secondary mortgage market. The exemplary decision support system 200 enables access to the data sources 121 for entities investing in the transferable electronic records or securities derived therefrom.

The exemplary decision support system 200 provides information about a transferable electronic record or group of records, including controller information and custodian information. The exemplary decision support system 200 is an automated system for receiving information from the data sources 121 using the encryption key.

The second party may provide direct access using devices such as: digital certificates, encryption keys, encryption algorithms, user authentication, document fingerprinting technology, or other security related services to a third party to access the data sources 121.

The exemplary decision support system 200 uses such services for user authentication, secure communications and copy authentication. The second party provides user identification and credentialing to ensure that only authorized entities or institutions with defined needs for the original trusted repository have access to the data source 121.

Next, the DVS server 105a receives the first set of data associated with the financial transaction and validates the mortgage data associated with the financial transaction by applying validation heuristics 325 which validate the assertions made by the first party from the data source 121.

The DVS server 105a may also compare income and asset data provided by the borrower in the delivered loan to secondary information. The comparison would include comparing data supplied by the second party that relates to the first party with data obtained from the data source 121 to validate and assess credit worthiness prior to making a decision on the application for a financial transaction.

Finally, the server outputs 330 a finding report, so as to provide (e.g., to the second party) validation heuristics output. The finding report may support or dispute the second party's assertions regarding the income, assets, or other verifiable statements of the first party.

The finding report may further conclude whether the second party's data are sufficient to determine the validity of the first party's statement of income, assets, and other verifiable items.

The output file may be an XML file. An XML file allows information to be structured and classified so that it is easy to tell the difference between pieces of information (e.g., a lender's telephone number, and a borrower's zip code). Particularly, XML defines the structure and classification of information in tags or elements. These tags or elements are integrated within the information itself. XML markup tags such as <LENDER> and <BORROWER> easily identify important and meaningful information about the content of the electronic document. The names of the tags and the structure of XML documents are defined by a document type definition (DTD). The DTD associated with a particular electronic document describes the tags or markup and the structure of the document, and specifies which tags contain other tags. For example, the XML tag <PROPERTY> might contains four tags <StreetAddress>, <City>, <State>, and <PostalCode>.

Figure 4B:

FIGS. 4A-B illustrate display diagrams for an income validation view 400a and a corresponding income verification report 400b. The income validation view 400a includes a reported income section that depicts the reported income as reported into the underwriting system. In addition, the income validation view 400a has a validation summary section and a validation messages section. The summary section provides an overview of the account, the provided income and a field indicating whether the amount is successfully verified according to the DVS provided automated validation. The messages section contains a listing of messages pertinent to income validation. The income verification report 400b may be instantiated as a pop up display that overlays the income validation view 400a, and includes third party provided information that verifies the income information provided to the underwriting system. It may further include historical income data.

Figure 5A:
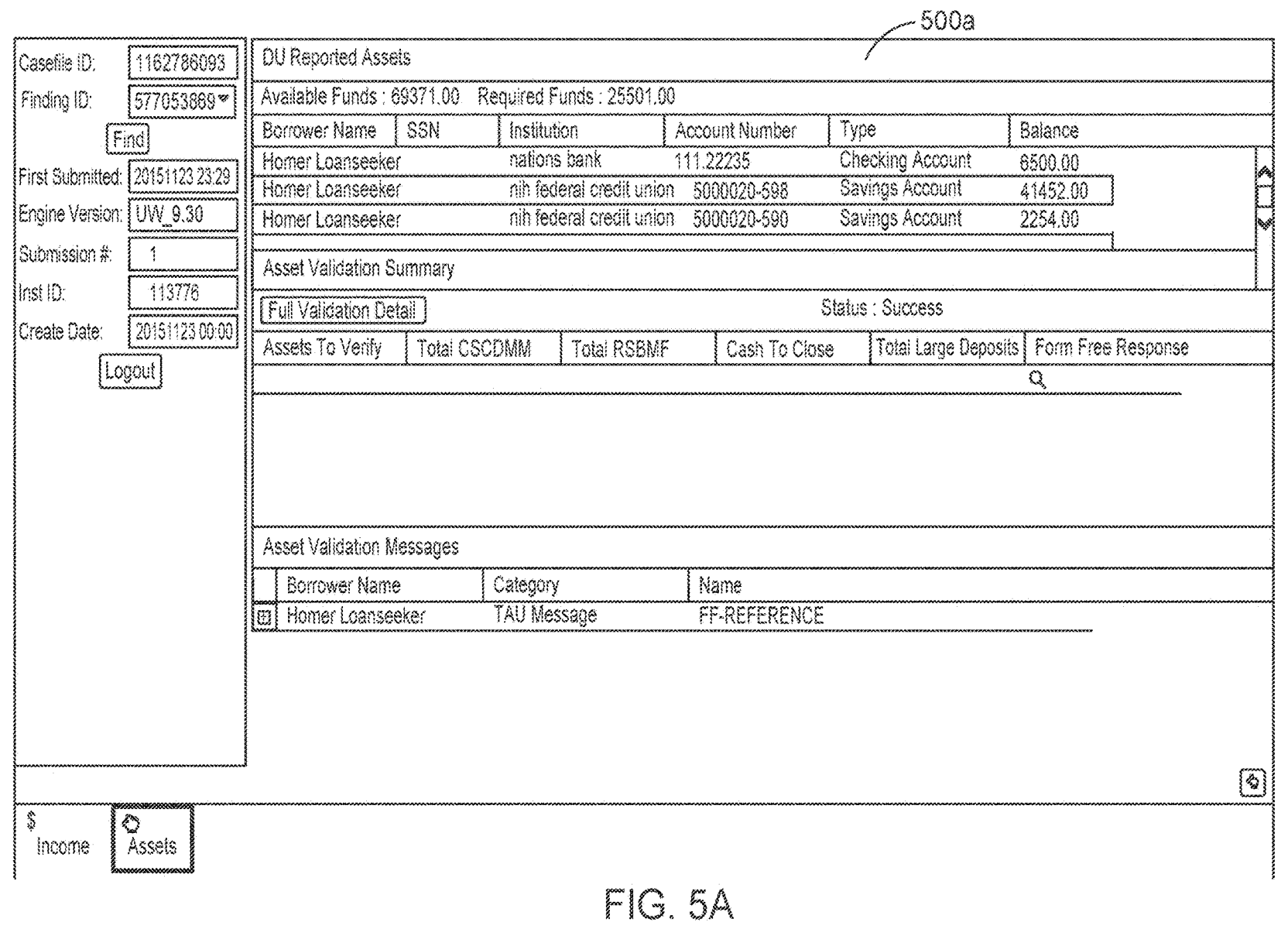
Figure 5B:
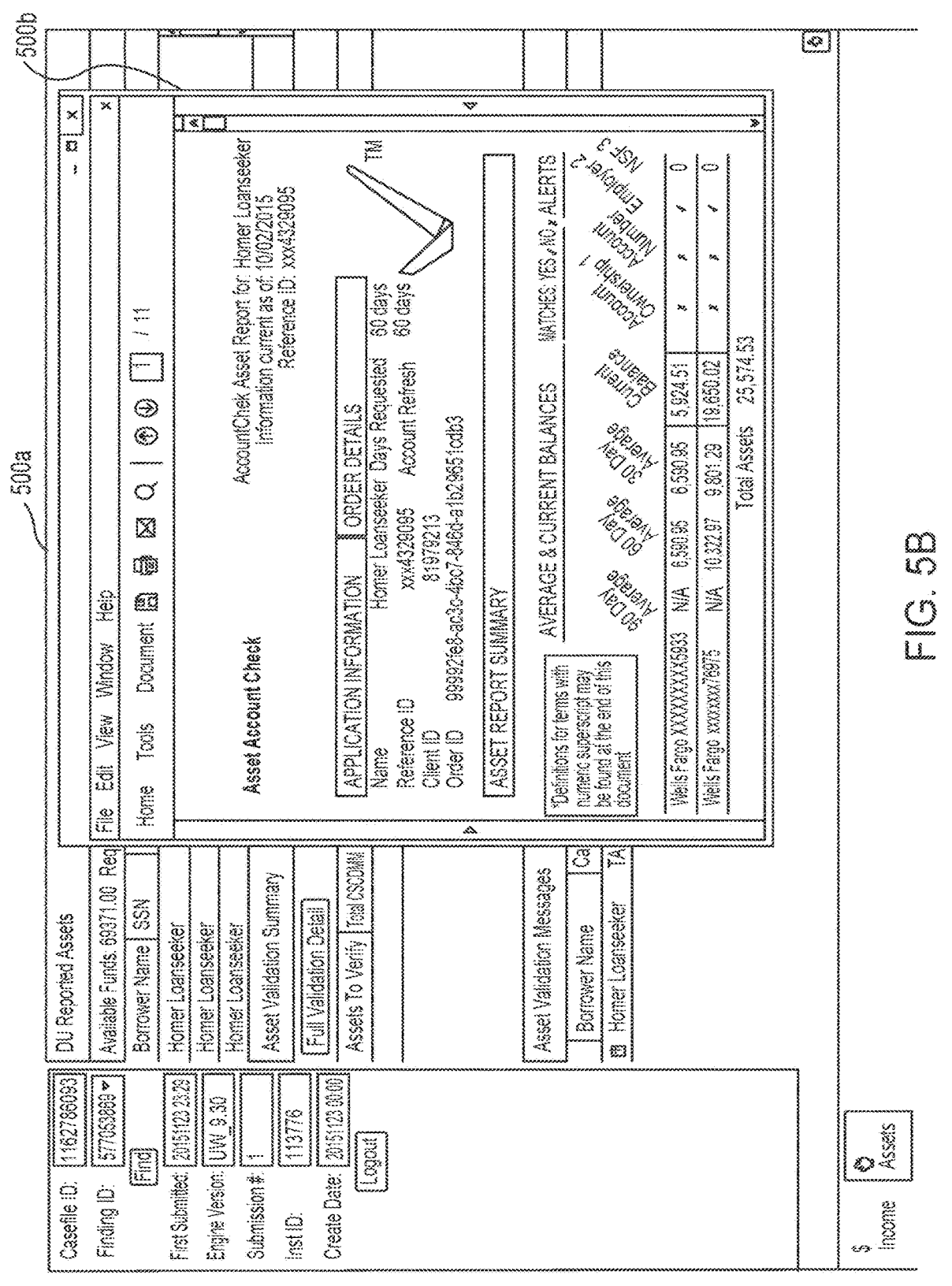

FIGS. 5A-B illustrate display diagrams for an asset validation view 500a and an asset verification report 500b. The asset validation view 500a similarly includes a reported assets section, an asset validation summary section and a messages section. The summary section provides an overview of the account, asset verification categories, and a status section indicating whether automated validation of the DVS produced a success or failure upon verification. The asset verification report 500b is similarly instantiated as a pop up display that overlays the asset validation view 500a and includes third party provided information that verifies the reported assets of the borrower. The DVS generates and/or accesses and reproduces these and other interfaces in connection with the automated validation.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein.

It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description.

The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein.

In particular, use of the singular articles such as "a," "the," "said," etc. should be read to recite one or more of the indicated elements unless a claim recites an explicit limitation to the contrary.

The invention claimed is:

1. A method for automated data validation in an application for a mortgage loan, the method comprising:
    electronically receiving a query for a financial transaction between a first party and a second party, wherein the financial transaction is a loan application, the first party is a borrower, and the second party is a lender;
    electronically receiving an encryption key from the second party;
    electronically transmitting the encryption key to a data source and accessing a first set of a data associated with the financial transaction through use of the encryption key;
    electronically analyzing the first set of data to derive asset information of the borrower from secondary information in the first set of data, the asset information including income, the secondary information including at least one of base income, overtime or bonus information;
    validating the first set of data associated with the financial transaction by applying validation heuristics, wherein validating the first set of data includes validating the loan application by applying the validation heuristics to the derived asset information, and wherein validating the first set of data is used to generate a finding report; and
    outputting the finding report to the second party.

2. The method of claim 1, further comprising:
    comparing the first set of data for the financial transaction with a second set of data for the financial transaction, wherein
    the first set of data are data received from the data source and the second set of data are data received from the first party.

3. The method of claim 1, further comprising:
    electronically communicating, to the second party, the validation heuristics used for generating the finding report.

4. The method of claim 1, further comprising:
    electronically analyzing, by the processing unit, the first set of data to derive cash flow, income, assets and credit worthiness of the first party.

5. The method of claim 1, wherein the first set of data associated with the financial transaction is an audit copy from the data source.

6. The method of claim 1, wherein the derived asset information further includes one or more of cash flow, assets and credit worthiness of the borrower.

7. A non-transitory computer readable medium that stores program code that is configured to, when executed by a computing system, cause the computing system to perform operations comprising:
    electronically receiving a query for a financial transaction between a first party and a second party, wherein the financial transaction is a loan application, the first party is a borrower, and the second party is a lender;
    electronically receiving an encryption key from the second party;
    electronically transmitting the encryption key to a data source and accessing a first set of a data associated with the financial transaction through use of the encryption key;
    electronically analyzing the first set of data to derive asset information of the borrower from secondary information in the first set of data, the asset information including income, the secondary information including at least one of base income, overtime or bonus information;
    validating the first set of data associated with the financial transaction by applying validation heuristics, wherein validating the first set of data includes validating the loan application by applying the validation heuristics to the derived asset information, and wherein validating the first set of data is used to generate a finding report; and
    outputting the finding report to the second party.

8. The non-transitory computer readable medium of claim 7, wherein the operations further comprise:
    electronically comparing the first set of data for the financial transaction with a second set of data for the financial transaction, wherein
    the first set of data are data received from the data source and the second set of data are data received from the first party.

9. The non-transitory computer readable medium of claim 7, wherein the operations further comprise:
    electronically communicating, to the second party, the validation heuristics used for generating the finding report.

10. The non-transitory computer readable medium of claim 7, wherein the operations further comprise:
electronically analyzing the first set of data to derive cash flow, income, assets and credit worthiness of the first party.

11. The non-transitory computer readable medium of claim 7, wherein the derived asset information further includes one or more of cash flow, assets and credit worthiness of the borrower.

12. A system, comprising:
a device including a memory with an application configured to validate data in an application installed thereon, wherein the application is configured to:
electronically receiving a query for a financial transaction between a first party and a second party, wherein the financial transaction is a loan application, the first party is a borrower, and the second party is a lender;
electronically receiving an encryption key from the second party;
electronically transmitting the encryption key to a data source and accessing a first set of a data associated with the financial transaction through use of the encryption key;
electronically analyzing the first set of data to derive asset information of the borrower from secondary information in the first set of data, the asset information including income, the secondary information including at least one of base income, overtime or bonus information;
validating the first set of data associated with the financial transaction by applying validation heuristics, wherein validating the first set of data includes validating the loan application by applying the validation heuristics to the derived asset information, and wherein validating the first set of data is used to generate a finding report; and
outputting the finding report to the second party.

13. The system of claim 12, wherein the application is configured to:
electronically compare the first set of data for the financial transaction with a second set of data for the financial transaction, wherein
the first set of data are data received from the data source and the second set of data are data received from the first party.

14. The system of claim 12, wherein the application is configured to:
electronically communicate, to the second party, the validation heuristics used for generating the finding report.

15. The system of claim 12, wherein the application is configured to:
electronically analyze the first set of data to derive cash flow, income, assets and credit worthiness of the first party.

16. The system of claim 12, wherein the derived asset information further includes one or more of cash flow, assets and credit worthiness of the borrower.

* * * * *